United States Patent [19]
Schedler et al.

[11] Patent Number: 5,839,894
[45] Date of Patent: Nov. 24, 1998

[54] METHOD FOR THE THERMAL DEDUSTING OF REGENERATIVE AFTERBURNING SYSTEMS WITHOUT THE RELEASE OF CONTAMINANTS AND WITHOUT INTERRUPTION OF THE MAIN EXHAUST GAS STREAM

[76] Inventors: Johannes Schedler, Mittergrabenweg 72, A-8010 Graz; Heimo Thalhammer, Josef-Posch-Strasse 123, A-8052 Graz, both of Austria

[21] Appl. No.: 700,630

[22] Filed: Aug. 16, 1996

[30] Foreign Application Priority Data

Aug. 17, 1995 [AT]  Austria ..................................... 1386/95

[51] Int. Cl.[6] ................................................... F27D 17/00
[52] U.S. Cl. .......................... 432/181; 432/179; 432/180
[58] Field of Search .................... 432/179, 180, 432/181

[56] References Cited

U.S. PATENT DOCUMENTS

| | | | |
|---|---|---|---|
| 3,870,474 | 3/1975 | Houston | 432/181 |
| 5,026,277 | 6/1991 | York . | |
| 5,101,741 | 4/1992 | Gross et al. | 432/181 |
| 5,134,945 | 8/1992 | Reimlinger et al. | 432/181 |
| 5,259,757 | 11/1993 | Plejdrup et al. . | |
| 5,279,235 | 1/1994 | Greco | 432/181 |
| 5,365,863 | 11/1994 | D'Souza | 432/181 |
| 5,417,927 | 5/1995 | Houston | 432/181 |
| 5,531,593 | 7/1996 | Klobucar | 432/181 |
| 5,538,420 | 7/1996 | Klobucar et al. | 432/181 |
| 5,540,584 | 7/1996 | Greco | 432/181 |
| 5,620,668 | 4/1997 | Driscoll et al. | 432/181 |

FOREIGN PATENT DOCUMENTS

| | | |
|---|---|---|
| 0 472 605 | 3/1992 | European Pat. Off. . |
| 34 28 537 | 2/1985 | Germany . |

Primary Examiner—Teresa J. Walberg
Assistant Examiner—Jiping Lu
Attorney, Agent, or Firm—Flynn, Thiel, Boutell & Tanis, P.C.

[57] ABSTRACT

Figure 1:
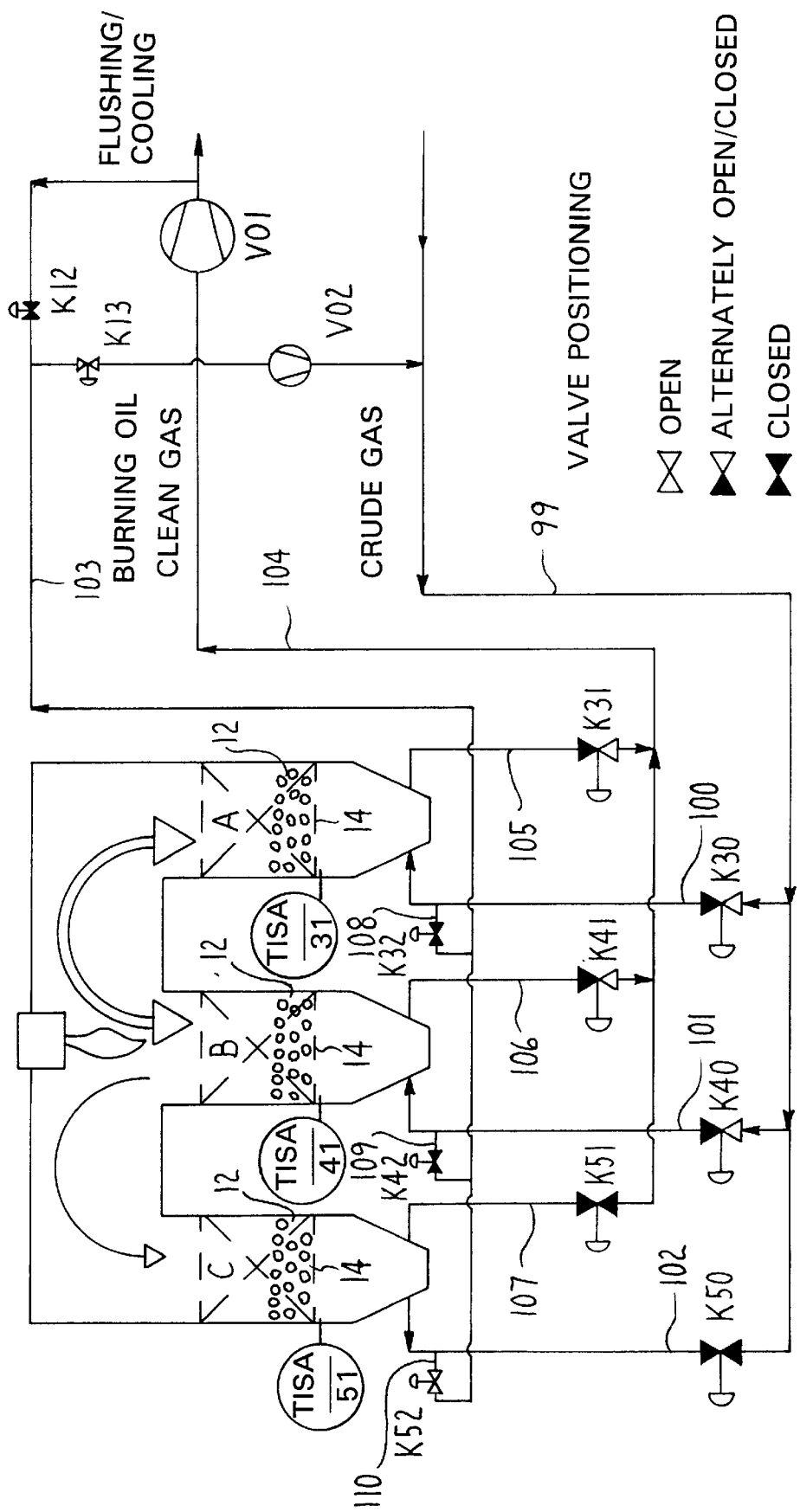

The invention relates to a method for the automatic and energy-saving dedusting of organic deposits on heat exchangers of regenerative afterburning systems without secondary emissions. Through a special guiding of the exhaust gas, the partial exhaust-air stream is returned without interruption of the main exhaust gas stream from the tower to be burnt off completely into the crude gas (FIG. 1). With this, the entire system is returned without any additional operations again into the original clean initial state and the burdening of the atmosphere is avoided.

7 Claims, 2 Drawing Sheets

1

METHOD FOR THE THERMAL DEDUSTING OF REGENERATIVE AFTERBURNING SYSTEMS WITHOUT THE RELEASE OF CONTAMINANTS AND WITHOUT INTERRUPTION OF THE MAIN EXHAUST GAS STREAM

The invention relates to a method for the thermal cleaning of organic contaminants. Thermally regenerative systems for the combustion of exhaust air have been successfully utilized for many different applications for many years. Since the combustion requires a temperature of 800° C., heat exchangers, which are as efficient as possible, must be used. Usually regenerative methods utilize bulk from ceramic tower packings for the heat exchange (DE 3428537, U.S. Pat. No. 5,026 277). Furthermore, the Patent EP 0472605 shows that ceramic honeycombed bodies enable a significantly more efficient heat exchange with less loss of pressure than dumping-bed reactors.

Thus, it is possible to also clean large exhaust gas streams with a relatively low energy usage.

However, exhaust gases often contain, in addition to the gaseous contaminants, organic aerosols like lacquer fog, resin fog, bitumen vapors, pyrolytic products and organic dusts, which during long operating intervals cause deposits to appear on the ceramic heat exchangers. This causes an increase in the loss of pressure in the system, thus the capacity of the system is reduced until help can be provided through mechanical cleaning measures. These demand a large amount of time for cleaning the heat-exchanger ceramics and thus reduce the availability of the RNV system significantly.

The high temperature stability of the ceramic honeycombs, however, makes it possible to achieve, by raising the temperature level in the lower cooler area of the ceramics, a burning off of the organic deposits. Thus, a full reestablishment of the free passage can be achieved without any mechanical cleaning. In addition, the honeycomb shape of the ceramics enables an efficient passage of compressed air therethrough in order to remove any possible inorganic residues.

This process is accomplished up to now by additional special exhaust pipes or by existing flushing pipes, which enable a longer lasting one-sided downward flow direction from the combustion chamber into the regenerator to be cleaned.

In addition, by returning the partial flow from the tower to be cleaned into the combustion chamber, a burdening of the atmosphere with pyrolytic products from the deposits can be avoided (U.S. Pat. No. 5, 259, 757). Here, the high energy requirement of the burner in order to balance the temperature difference with respect to the combustion chamber temperature is a disadvantage.

A further improvement is offered by the return of the burdened exhaust air to the crude gas instead of to the combustion chamber, whereby the full efficiency of the regenerative heat exchanger is utilized.

This operation becomes particularly efficient through a special arrangement of valves and pipes and enables a cleaning of the system without reducing the main exhaust gas stream in contrast to U.S. Pat. No. 5, 259 757, column 3, lines 6–10 and 34–39.

EXAMPLE 1

FIG. 1 shows a 3-bed system with a suction-side main ventilator, which is initially A, B and C. Each tower, A, B, and C, is provided with a mass of ceramic heat exchangers 12 that rest on a grate 14 internal to the tower. Each tower A, B, and C is provided with a temperature sensor TISA31, TISA41 and TISA 51, respectively, integral its grate 14 for monitoring the temperature internal to the tower. Crude gas is supplied to the system through a crude gas main line 99. The crude gas is supplied to the individual towers A, B and C through crude gas branch lines 100, 101 and 102, respectively, that extend from crude gas main line 99. Crude gas flow through the individual branch lines 100, 101 and 102 is controlled by valves K30, K40 and K50, respectively. Cleaned gas is removed from the system through a clean gas main line 104. Clean gas is drawn from the individual towers A, B and C through clean gas branch lines 105, 106 and 107, respectively, that are connected to the clean gas main line 104. Valves K31, K41 and K51 connected to branch lines 105, 106 and 107, respectively, regulate gas flow through the branch lines. A blower V01 connected to clean gas main line 104 draws gas through the clean gas main line. There is also an exhaust gas main line 103. Towers A, B and C are connected to the exhaust gas main line by individual exhaust gas branch lines 108, 109 and 110, respectively. Gas flow through individual exhaust gas branch lines 108, 109 and 110 is regulated by valves K32, K42 and K52, respectively. Exhaust gas main line 103 is connected to a crude gas main line 99 through a blower V02. Gas flow through blower V02 is controlled by a valve K18. Exhaust gas main line 103 is also connected to at the output side of blower V01 integral with clean gas main line 104. Gas flow from blower V01 into exhaust gas main line 103 is controlled by valve K17 in the normal operation utilizing all 3 towers.

To start the thermal dedusting controlled by an increased difference in pressure, the system is first switched to a 2-bed operation. The main exhaust gas is thereby moved alternately in its full amount through towers A and B by means of head valves K30, K31 and K40, K41, whereby the cleaning capacity is approximately 97%. Both head valves K50 and K51 are closed at tower C. The valves K18 and K52 are now opened and a blower V02 draws a partial stream of the main exhaust stream of about 10% from the combustion chamber into the tower C. This partial stream now continuously heats the ceramics of tower C, whereby the desired increase in temperature is measured by a temperature sensor TISA 51. The exhaust gas now increasingly carries organic decomposition products and moves these into the crude gas and thus back into the system, whereby the pyrolytic products are burnt. After some hours, the temperature at the end of the regenerator reaches the desired value between 400° and 600° C. This temperature is subsequently maintained constant for a time period of 3 hours by closing and opening of valve K52. After this time, all organic deposits on the ceramics have been burnt off.

Valve K18 is then closed, valve K17 is opened and switching off the blower V02 now takes place, through which the cooling operation with clean gas is started. This cools the cone and the ceramics in the lower area. After approximately 1–2 hours, a switch to normal operation with 3 towers or to an analogous dedusting of the next tower can be performed.

EXAMPLE 2

Figure 2:
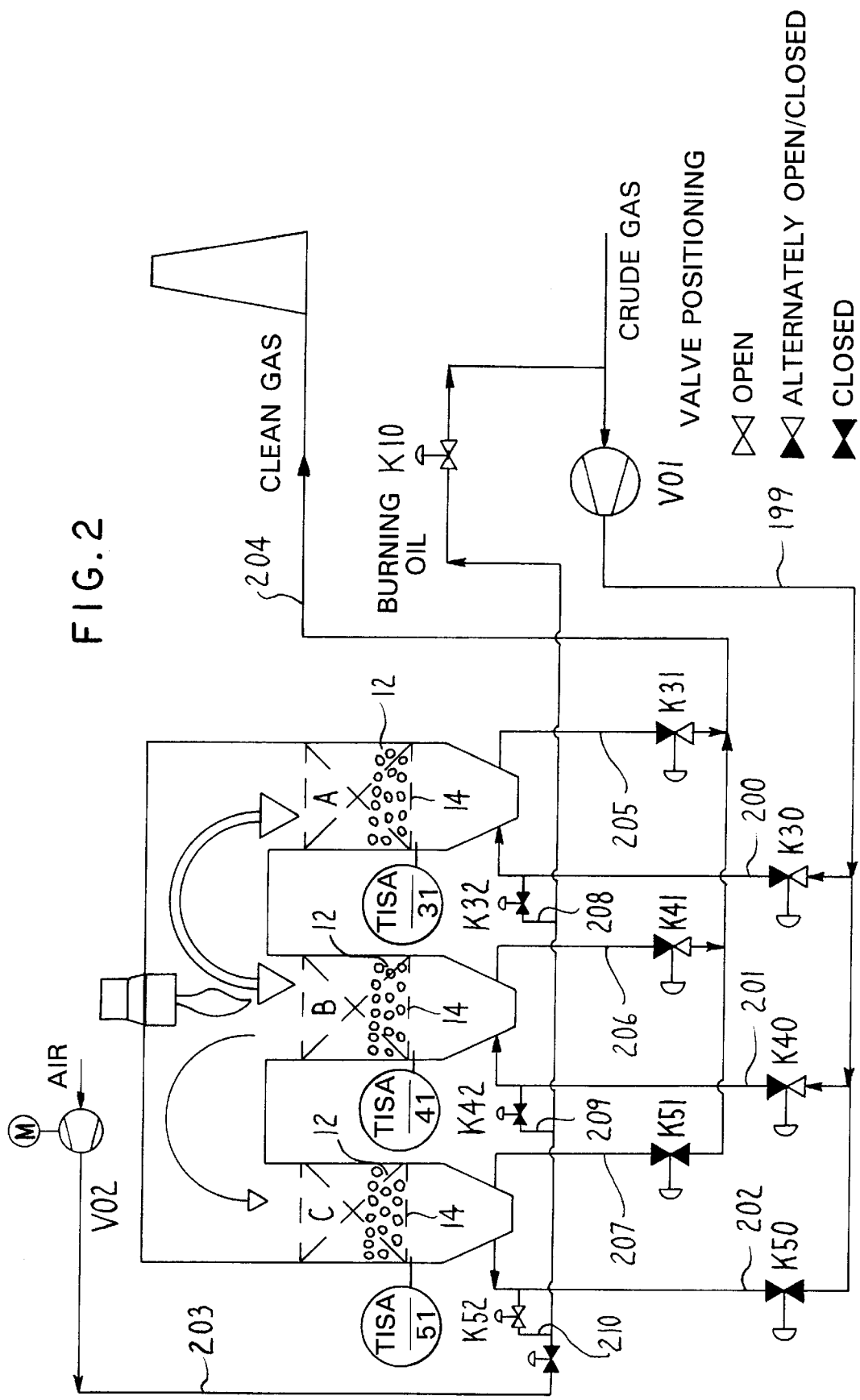

FIG. 2 shows a 3-bed system with a pressure-side main ventilator, which is initially in the normal operation utilizing all 3 towers A, B and C. through fresh air branch line 210 and the portion of the fresh air main line 203 connected to crude gas main line 199. Each tower A, B and C is provided with a mass of ceramic heat exchangers 12 that rest on a grate 14 internal to the tower. Each tower A, B and C is provided with a temperature sensor TISA31, TISA41 and TISA 51, respectively, integral its grate 14 for monitoring the temperature internal to the tower. Crude gas is supplied to the system through a crude gas main line 199. The crude gas is supplied to the individual towers A, B and C through crude gas branch lines 200, 201 and 202, respectively, that extend from crude gas main line 199. Crude gas flow through the individual branch lines 200, 201 and 202 is controlled by valves K30, K40 and K50, respectively. A blower V01 forces crude gas through crude gas main line 199 and the associated branch lines 200, 201, 202. Clean gas is removed from the system through a clean gas main line 204. Clean gas is drawn from the individual towers A, B and C through clean gas branch lines 205, 206 and 207, respectively, that are connected to the clean gas main line 204. Valves K31, K41 and K51 connected to branch lines 205, 206 and 207, respectively, regulate gas flow through the branch lines. Fresh air is introduced through a fresh air main line 203. Branch lines 208, 209 and 210 connect the towers A, B and C, respectively, to the fresh air line 203. Gas flow through branch lines 208, 209 and 210 is regulated by valves K32, K42 and K52, respectively. Fresh air line 203 has a tail end downstream of branch lines 208, 209 and 210 that is connected to the inlet end of blower V01 in-line with crude gas main line 199. A blower V02 draws fresh air into an opposed head end of fresh air main line 203. A valve K17 located downstream of blower V02 and upstream of branch lines 208, 209 and 210 regulates air flow from the blower. A valve K16 in-line with fresh air line 203 located downstream of branch lines 208, 209 and 210 and upstream of blower V01 controls air flow from fresh air main line 203 into crude gas main line 199.

To start the thermal dedusting controlled by an increased difference in pressure, the system is first switched to a 2-bed operation. The main exhaust gas is thereby moved alternately in its full amount through towers A and B by means of the head valves K30, K31 and K40, K41, whereby the cleaning capacity is approximately 97%. Both main valves K50 and K51 are closed at tower C. Valves K16 and K52 are now opened and a main blower V01 sucks a partial stream of the main exhaust gas stream from the combustion chamber into the tower C through fresh air branch line 210 and the portion of the fresh air main line 203 connected to crude gas main line 199. This partial stream now continuously heats the ceramics of the tower C, whereby the desired increase in temperature is measured by temperature sensor TISA 51. The exhaust gas now increasingly carries organic decomposition products and transports these into the crude gas and thus back into the system, whereby the pyrolytic products are burnt. After some hours, the temperature at the end of the regenerator reaches the desired value of between 400° to 600° C. This temperature is subsequently maintained constant for a time period of 3 hours by closing and opening of valve K52. After this time, all organic deposits on the ceramics have been burnt off.

The valve K16 is now closed and valve K17 is switched open with the start of blower V02, which causes the cooling operation with fresh air to begin. This cools the cone and the ceramics in the lower area. After approximately 1–2 hours, a switch to normal operation with 3 towers or to an analogous dedusting of the next tower can take place, whereby the flushing of the towers is again done through valve K16 and blower V01.

It is claimed:

1. A method for thermally dedusting components of a regenerative afterburning system without the release of contaminates, comprising the steps of:

providing an afterburning system with at least three regeneration towers that are connected to a common combustion chamber, wherein each said regeneration tower is filled with ceramic components;

employing at least two of said regeneration towers in a crude gas cleaning process by supplying a first one of said regeneration towers with crude gas to be cleaned, burning the crude gas in the combustion chamber to obtain clean gas and drawing the clean gas through a second one of said regeneration towers and cyclically alternating the process so that crude gas is supplied to the second said regeneration tower and the clean gas is drawn through the first said regeneration tower;

heating the at least one remaining regeneration tower so that contaminants on the ceramic components are burned off into an exhaust gas by forcing a stream of heated air from the combustion chamber into the at least one remaining regeneration tower;

drawing the exhaust gas from the at least one remaining regeneration tower and mixing the exhaust gas with the crude gas that is supplied to the at least two regeneration towers;

allowing the temperature of the at least one remaining regeneration tower to rise to between 400° and 600° C.; and cooling the at least one remaining regeneration tower with the clean gas produced by the afterburning system.

2. The method according to claim 1, wherein the afterburning system is available during the entire thermal dedusting operation including the heating and cooling of the at least one remaining regeneration tower for the simultaneous cleaning of the crude gas in the two-tower crude gas cleaning step.

3. The method of claim 1, wherein the ceramic components internal to each regeneration tower are held on a support grate and further including the step of providing a temperature sensor on each support grate for providing an indication of the temperature in each regeneration tower.

4. The method according to claim 1, wherein: the afterburning system is further configured so that:

crude gas is supplied to the regeneration towers through a crude gas main line wherein a crude gas branch line is connected between the crude gas main line and each regeneration tower and gas flow through the individual crude gas branch lines is regulated by individual crude branch line valves;

cleaned gas is removed from the afterburning system through a clean gas main line wherein the individual regeneration towers are connected to the clean gas main line through individual clean gas branch lines, gas flow through the individual clean gas branch lines is controlled by individual clean gas branch line valves and a first blower is connected to the clean gas main line for drawing the cleaned gas through the clean gas main line; and an exhaust gas main line is provided wherein said exhaust gas main line is connected to the individual regeneration towers through individual exhaust gas branch lines, gas flow from the regeneration towers through the individual exhaust gas branch lines is controlled by individual exhaust branch gas line valves in the exhaust gas branch lines, and the exhaust gas main line is connected to the crude gas main line downstream of a point at which the exhaust gas branch lines are connected to the exhaust gas main line, a second blower draws gas from the exhaust gas main line into the crude gas main line, gas flow from the exhaust gas main line into the second blower is controlled by a first recirculation valve and the exhaust gas main line is further connected to the clean gas main line downstream from the point at which the first blower is connected to the clean gas main line and a second recirculation valve is connected to the exhaust gas main line for controlling gas flow from the clean gas main line to the exhaust gas main line;

during the heating of the at least one remaining regeneration tower, the first recirculation valve is opened, the second recirculation valve is closed and the second blower is actuated so that the exhaust gas from the at least one remaining regeneration tower is drawn through the exhaust gas branch line connected to the at least one remaining regeneration tower and the exhaust gas main line and is then forced into the crude gas main so as to mix with the crude gas; and during the cooling of the at least one remaining regeneration tower, the first recirculation valve is closed and the second recirculation valve is opened and the second blower is employed to force the clean gas from the clean gas main line through the exhaust gas main line, the exhaust gas branch line connected to the at least one remaining regeneration tower and into the at least one remaining regeneration tower.

5. The method of claim 4, wherein the ceramic components internal to each regeneration tower are held on a support grate and further including the step of providing a temperature sensor on each support grate for providing an indication of the temperature in each regeneration tower.

6. The method according to claim 1, wherein during said step of heating the at least one remaining regeneration tower, after the temperature of the at least one remaining regeneration tower rises to between 400° and 600° C., the temperature of the at least one remaining regeneration tower is maintained for a period of time sufficient to cause the burn off of organic deposits on the ceramic components internal to the at least one regeneration tower prior to performing said step of cooling the at least one remaining regeneration tower.

7. The method of claim 6, wherein during said step of heating the at least one remaining regeneration tower, the temperature of the at least one remaining regeneration tower is maintained between 400° and 600° C. for approximately three hours.

* * * * *

UNITED STATES PATENT AND TRADEMARK OFFICE
CERTIFICATE OF CORRECTION

PATENT NO. : 5,839,894
DATED : November 24, 1998
INVENTOR(S) : Johannes SCHEDLER et al It is certified that error appears in the above-indentified patent and that said Letters Patent is hereby corrected as shown below:

On title page, in the diagram of the drawing, by reference numeral 103; change "BURNING OIL" to ---BURNING OFF---.

Figure 1, by reference numeral 103; change "BURNING OIL" to ---BURNING OFF---.

Figure 2, by reference numeral "K10"; change "BURNING OIL" to ---BURNING OFF---.

Signed and Sealed this

Tenth Day of August, 1999

Attest:

Q. TODD DICKINSON

*Attesting Officer*  *Acting Commissioner of Patents and Trademarks*